United States Patent [19]

Gano et al.

[11] Patent Number: 5,731,890
[45] Date of Patent: Mar. 24, 1998

[54] AROMATIC RINGS WITH ROTATED ADJACENT CHROMOPHORES

[75] Inventors: James E. Gano, Sylvania; Padmanabhan Sekher, Toledo, both of Ohio

[73] Assignee: The University of Toledo, Toledo, Ohio

[21] Appl. No.: 711,503

[22] Filed: Sep. 10, 1996

[51] Int. Cl.⁶ ............... G02F 1/00; G02B 5/22; G03G 5/00

[52] U.S. Cl. ............ 359/321; 359/245; 359/251; 359/256; 359/320; 359/322; 359/323; 252/589; 430/71

[58] Field of Search ............ 359/320, 321, 359/322, 323, 251, 256, 245; 252/589; 430/71

[56] References Cited

U.S. PATENT DOCUMENTS

| | | | |
|---|---|---|---|
| 3,338,877 | 8/1967 | Anderson | 526/181 |
| 3,674,473 | 7/1972 | Blanchette | 430/71 |
| 4,757,130 | 7/1988 | DeMartino | 528/288 |
| 4,807,968 | 2/1989 | Leslie | 359/321 |
| 4,887,889 | 12/1989 | Leslie | 359/321 |
| 4,961,631 | 10/1990 | Clement et al. | 359/322 |
| 4,966,730 | 10/1990 | Clement et al. | 252/589 |
| 5,015,417 | 5/1991 | Clement et al. | 252/587 |
| 5,081,251 | 1/1992 | Bender et al. | 546/350 |
| 5,130,603 | 7/1992 | Tokalin et al. | 313/504 |
| 5,200,541 | 4/1993 | Thami | 556/110 |

OTHER PUBLICATIONS

Effects of Phenyl Substitution on the Fragmentation of Sterically Congested Di-tert-butylstilbene Radical Cations, James E. Gano., Journal of Mass Spectrome, vol. 31, 363-366 (1996).

Novel, Blue-Transparent Frequency Doublers Based on 1,8-Die(hetero)arylnaphthalenes, Andre Bahl, et al., Angew. Chem. Int. Ed. Engel, 1995, 34, No. 13/14, 1485-1488.

*Primary Examiner*—David C. Nelms
*Assistant Examiner*—Evelyn A. Lester
*Attorney, Agent, or Firm*—Brinks Hofer Gilson & Lione

[57] ABSTRACT

A compound having nonlinear optical properties of the general formula:

$$Ar^1CR^1=CR^2(Ar^2CR^3=CR^4)_nAr^3 \qquad (I)$$

wherein, n represents a whole number; $R^1$, $R^1$, $R^3$ and $R^4$ groups are independently selected from H, branched aliphatic, straight chain aliphatic, branched silane or straight chain silane; $Ar^1$ and $Ar^3$ are aromatic radicals having a substituent in at least one position adjacent to a site of attachment of the C=C double bond and having at least one electron withdrawing or electron donating substituent in at least one of the remaining positions; $Ar^2$ is an aromatic radical having a substituent in at least one position adjacent to a site of attachment of the C=C double bond; with the proviso that the substituent in at least one position adjacent to the site of attachment of the C=C double bond and $R^1$, $R^2$, $R^3$ and $R^4$ groups are sufficiently large to cause $Ar^1$, $Ar^2$ and $Ar^3$ to rotate approximately perpendicular to a plane containing each adjacent C=C double bond and its substituents and a nonlinear optical device including a compound of the general formula (I).

47 Claims, No Drawings

AROMATIC RINGS WITH ROTATED ADJACENT CHROMOPHORES

FIELD OF THE INVENTION

The present invention relates to aromatic rings with rotated adjacent chromophores. More particularly, the present invention relates to aromatic rings with adjacent chromophores rotated out of conjugation to provide unique nonlinear optical properties.

BACKGROUND OF THE INVENTION

In the presence of an electric field a molecule's dipole moment can be described by the following expansion:

$$\mu = \mu_0 + \alpha E + \beta EE + \gamma EEE + \ldots$$

where $\mu$ is the induced dipole moment plus $\mu_0$, the permanent dipole moment of the compound; $\alpha$, $\beta$, and $\gamma$ are the linear, second order and third order polarizabilities, respectively; and E is the applied electric field. The nonlinear response is reflected in the magnitude of $\beta$ and $\gamma$, etc. To describe an ensemble of molecules such as a crystal, the macroscopic relationship for the polarization can be described as the following expansion:

$$P = P_0 + \chi^{(1)}E + \chi^{(2)}EE + \chi^{(3)}EEE + \ldots$$

where P is the induced polarization plus $P_0$, the permanent polarization; and $\chi^{(1)}$, $\chi^{(2)}$ and $\chi^{(3)}$ are the linear, second order and third order susceptibility, respectively. Second order nonlinear phenomena such as second harmonic generation, sum and difference frequency generation, parametric processes and electro-optical effects all arise from the $\chi^{(2)}$ term. For crystals of a material to a large $\chi^{(2)}$, the molecules making up the material should possess both a large $\beta$ and crystallize in a noncentrosymmetric structure. Third order nonlinear phenomena, such as those useful in photonics, arise from the $\chi^{(3)}$ term. To have a large $\chi^{(3)}$ a molecule should possess a large $\gamma$.

For a more detailed discussion of nonlinear optics, reference is made to U.S. Pat. Nos. 4,807,968; 4,887,889 and 4757,130, incorporated herein by reference.

Materials with new, novel nonlinear optical properties are continually being sought in order to invent new devices. For example, inorganic nonlinear optical materials have been developed into a variety of useful devices such as frequency doublers that are used in laser systems to generate additional frequencies of light and as electro-optical switches.

Organic materials are known to possess superior nonlinear optical properties but the development of suitable useful applications has been limited by some of the other properties of the materials. For example, absorption of light at the frequency of frequency doubled radiation, low thermal stability and poor chemical stability.

Some of the classes of organic materials that have been explored as nonlinear optical materials are typified by a conjugated π system supporting an electron withdrawing and an electron donating group. They function by possessing a significant transfer of electron density when light is absorbed, a charge transfer, from the electron rich to electron poor center through the intervention of the conjugated π system. Another class is typified by very long symmetrical conjugated π systems, for example poly(diacetylenes).

It will be appreciated from the foregoing that there is still a significant need for organic materials with fundamentally new structural motifs possessing nonlinear optical properties. Accordingly, it is an object of the present invention to provide novel compounds having nonlinear optical properties. It is a further object of the present invention to provide optical devices having a nonlinear optical component comprising a transparent solid medium of a compound having nonlinear optical properties.

SUMMARY OF THE INVENTION

Briefly, according to the present invention there is provided a compound having nonlinear optical properties of the general formula:

(I)

wherein, n represents a whole number; $R^1$, $R^2$, $R^3$ and $R^4$ groups are independently selected from H, branched aliphatic, straight chain aliphatic, branched silane or straight chain silane; $Ar^1$ and $Ar^3$ are aromatic radicals having a substituent independently selected from H, branched aliphatic, straight chain aliphatic, branched silane or straight chain silane in at least one position adjacent to a site of attachment of the C=C double bond and having at least one electron withdrawing or electron donating substituent in at least one of the remaining positions; $Ar^2$ is an aromatic radical having a substituent independently selected from H, branched aliphatic, straight chain aliphatic, branched silane or straight chain silane in at least one position adjacent to a site of attachment of the C=C double bond; with the proviso that the substituent in at least one position adjacent to the site of attachment of the C=C double bond and $R^1$, $R^2$, $R^3$ and $R^4$ groups are sufficiently large to cause $Ar^1$, $Ar^2$ and $Ar^3$ to rotate approximately perpendicular to a plane containing each adjacent C=C double bond and its substituents.

The present invention also includes a nonlinear optical device comprising a nonlinear optical element, a source of coherent radiation, and means for directing the radiation into the element. The nonlinear optical element includes a crystalline solid or poled solid containing a compound of the general formula:

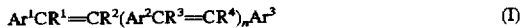

(I)

wherein, n represents a whole number; $R^1$, $R^2$, $R^3$ and $R^4$ groups are independently selected from H, branched aliphatic, straight chain aliphatic, branched silane or straight chain silane; $Ar^1$ and $Ar^3$ are aromatic radicals having a substituent independently selected from H, branched aliphatic, straight chain aliphatic, branched silane or straight chain silane in at least one position adjacent to a site of attachment of the C=C double bond and having at least one electron withdrawing or electron donating substituent in at least one of the remaining positions; $Ar^2$ is an aromatic radical having a substituent independently selected from H, branched aliphatic, straight chain aliphatic, branched silane or straight chain silane in at least one position adjacent to a site of attachment of the C=C double bond; with the proviso that the substituent in at least one position adjacent to the site of attachment of the C=C double bond and $R^1$, $R^2$, $R^3$ and $R^4$ groups are sufficiently large to cause $Ar^1$, $Ar^2$ and $Ar^3$ to rotate approximately perpendicular to a plane containing each adjacent C=C double bond and its substituents.

DESCRIPTION OF THE PREFERRED EMBODIMENTS

The present invention is directed to compounds having nonlinear optical properties represented by the general formula:

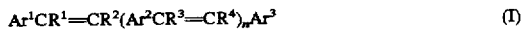

(I)

wherein, n represents a whole number.

In the above general formula, Ar$^1$ and Ar$^3$ are aromatic radicals having a substituent independently selected from H, branched aliphatic, straight chain aliphatic, branched silane or straight chain silane group in at least one position adjacent to a site of attachment of the C=C double bond and having at least one electron withdrawing or electron donating substituent in at least one of the remaining positions. Ar$^2$ is an aromatic radical having a substituent independently selected from H, branched aliphatic, straight chain aliphatic, branched silane or straight chain silane group in at least one position adjacent to a site of attachment of the C=C double bond.

In a preferred embodiment, Ar$^1$, Ar$^2$ and Ar$^3$ are independently selected from aromatic radicals and heterocyclic aromatic radicals. The aromatic radicals include radicals of benzene, naphthalene, anthracene and biphenyl. The heterocyclic aromatic radicals contain nitrogen, oxygen, phosphorous, sulfur or selenium. Examples include radicals of heterocyclic ethers and derivatives thereof such as furan, thiophene, heterocyclic amines and derivatives thereof such as pyridine and quinoline.

In accordance with the present invention, the substituent in at least one position adjacent to the site of attachment of the C=C double bond and R$^1$, R$^2$, R$^3$ and R$^4$ groups are sufficiently large to cause the aromatic radicals Ar$^1$, Ar$^2$ and Ar$^3$ to rotate approximately perpendicular to a plane containing each adjacent C=C double bond and its substituents.

The substituents of the aromatic radical Ar$^2$ and on the positions adjacent to the site of attachment of the C=C double bond on the aromatic radicals Ar$^1$ and Ar$^3$ may be independently selected from H, branched aliphatic, straight chain aliphatic, branched silane or straight chain silane group. In a preferred embodiment, the substituents of the aromatic radicals may be independently selected from H, alkyl, branched alkyl, silyl, alkylsilyl, dialkylsilyl, and trialkylsilyl. Most preferably, the substituents of the aromatic radicals may be independently selected from H and tertiary butyl.

The aromatic radicals Ar$^1$ and Ar$^3$ also each include at least one electron donating and/or electron withdrawing substituent.

The term "electron donating" refers to organic substituents which contribute electron density to the π electron system when the conjugated electronic structure is polarized by the input of electromagnetic energy. The electron donating substituent may be —O$^-$, —COO$^-$, —OR, —CR$_3$, —OCOR, —NR$_2$, or —SR where R group is any alkyl group or H.

The term "electron withdrawing" refers to electronegative organic substituents which attract electron density from the π electron system when the conjugated electronic structure is polarized by the input of electromagnetic energy. The electron withdrawing substituent may be —NR$_3^+$, —SR$_2^+$, —NO$_2$, —SO$_2$R, —SO$_3$R, —CN, —SO$_2$Ar, —COOH, —F, —Cl, —Br, —I, —COOR, —COR, —CCR, —Ar, —CH=CR$_2$, or —C(CN)=C(CN)$_2$ where R group is any alkyl group or H.

The electron donating substituent and electron withdrawing substituent are positioned in at least one of the remaining positions of the aromatic radicals Ar$^1$ and Ar$^3$. The electron withdrawing properties may be varied by attaching, for example, acidic or basic substituents on the aromatic radicals as well known in the art. In a preferred embodiment, for a benzene ring, the electron donating substituent or electron withdrawing substituent may be at the meta or para position of the aromatic ring.

R$^1$, R$^2$, R$^3$ and R$^4$ groups may be independently selected from H, branched aliphatic, straight chain aliphatic, branched silane or straight chain silane. In a preferred embodiment, R$^1$, R$^2$, R$^3$ and R$^4$ groups may be independently selected from H, alkyl, branched alkyl, silyl, alkylsilyl, dialkylsilyl, and trialkylsilyl. In a most preferred embodiment, R$^1$, R$^2$, R$^3$ and R$^4$ groups may be independently selected from H and tertiary butyl.

The alkyl or silyl substituents of the aromatic radicals Ar$^1$, Ar$^2$ and Ar$^3$ or of R$^1$, R$^2$, R$^3$ and R$^4$ groups preferably contain from 1–5 carbon atoms to effectively control the rotation of the aromatic rings. However, it will be appreciated that it is believed that groups of more than 5 carbon atoms will also effectively control the rotation of the aromatic rings and improve the solubility properties of the compound having the general formula (I) in accordance with the present invention.

In one embodiment of the present invention, wherein n=0, the compound (I) having nonlinear optical properties is Z-stilbene with adjacent chromophores twisted out of conjugation. The substituted Z-stilbene includes cofacial, locked arene rings. The substituted Z-stilbene has a system of chromophores which are connected together, but due to out of plane twisting, are not conjugated. Large groups, tertiary butyl groups, are substituted at R$^1$ group and at R$^2$ group to force the arene rings out of conjugation as they rotate so that their planes are perpendicular to the plane of the central C=C double bond and its substituents. Consequently, the phenyl rings are directly adjacent to a π bond but not conjugated to the π bond. Thus, it will be appreciated that the three π systems are not formally conjugated. In addition, two faces of the phenyl rings are protected from complexation by the tertiary butyl groups but the other two faces form a unique pocket or cleft. At the base of the pocket, the phenyl rings are forced to interact at the ipso positions by a very short 2.65 Å internuclear distance. This close contact facilitates charge transfer in suitably substituted derivatives. In other words, the system is arranged for a charge transfer ring hopping transition through space rather than through the π bond as previously understood. The relative electronegativity of the two phenyl rings determines the degree of charge transfer. The control of the charge transfer activity can be achieved as a function of whether the chromophore substituents on the Z-stilbenes have the same or different electron donating or withdrawing properties. In a preferred embodiment, the chromophore substituents have a para nitro group on one ring and a para amino group on the other ring. All other positions on the rings are occupied by H.

The electron withdrawing or donating properties may be made variable by attaching, for example, acidic or basic substituents on the Z-stilbene in the para position. Substituents in the para positions predominantly effect the molecular orbital which interacts most strongly at the ipso positions. In one embodiment, under strongly acidic or basic conditions the substituents are identical such that there is no charge transfer activity. Increasing or decreasing the pH reversibly provides a different electron density on the phenyl rings and it is expected to show a charge transfer band in its absorption spectrum. In a preferred embodiment, the chromophore substituents have hydroxyl groups in the para position of both rings or amino groups in the para position of both rings.

When the materials as further described herein absorb light or are exposed to high temperatures, the Z-stilbene can isomerize about the C=C double bond to the E-configuration. It is recognized that if this isomerization is undesirable, a link can be established between the R groups as well known in the art, e.g. R$^1$ and R$^2$, which effectively prevents such isomerization.

The orientation of the molecules in solids is critical in designing nonlinear optical materials for certain applications. It will be appreciated that the Z-configuration of these molecules can pack together into interlocking doublets which then interact with adjacent doublets to form long interacting systems which can exhibit charge transfer transitions between adjacent units.

In another specific embodiment of the present invention, the compound (I) is an extended version of the embodiment previously described above. In this specific embodiment, n>0 and all C=C double bonds are in the Z-configuration and $Ar^1$ and $Ar^3$ have an electron withdrawing and an electron donating substituent, respectively. These materials with extended chromophores frequently show high values of $\chi^2$ and $\chi^3$. In a preferred embodiment, the compound having the general formula (I) given previously has a length of n=5. It will be appreciated that with very large values of n, materials may become difficult to manipulate due to reduced solubility. However, it will also be appreciated that using large alkyl chains on the R groups will alleviate this problem.

In yet another specific embodiment of the present invention, wherein n>0, all of the C=C double bonds are in the Z-configuration and $Ar^1$ and $Ar^3$ have identical electron withdrawing or electron donating substituents. It will be appreciated that these materials with extended chromophores frequently show high values of $\chi^3$. In a preferred embodiment, the compound having the general formula (I) given previously has a length of n=5. As previously stated, it will be appreciated that with very large values of n, materials may become difficult to manipulate due to reduced solubility. However, it will also be appreciated that using large alkyl chains on the R groups will alleviate this problem.

In another specific embodiment of the present invention, n=0, and the stilbene unit previously described is in the E-configuration and $R^1$ group and $R^2$ group are tertiary butyl. An electron withdrawing group is attached to one end of the system and an electron donating group is attached to the other end of the system for a charge transfer through a weakly coupled system of chromophores. It will be appreciated that because the chromophores are weakly coupled, the molecule is only slightly polarized in the ground state. In the excited state, a very large degree of polarization is expected. It is believed that a very small difference in substituents may provide a π system which is very polarized in the excited state although almost unpolarized in the ground state. Again, the prerequisite for nonlinear optical properties is achieved without the presence of a conjugated π system. In this preferred embodiment, the chromophore substituents have a nitro group in the para position of one ring and an amino group in the para position of the other ring.

When the E-configuration is exposed to high temperatures, the molecule will not isomerize as in the case of the Z-isomer because of the increased stability of the E-configuration.

In another embodiment of the present invention, the compound (I) is an extended version of the embodiment described above. In this embodiment, n>0 and all C=C double bonds have the E-configuration and $Ar^1$ and $Ar^3$ have an electron withdrawing and an electron donating substituent, respectively. Materials with extended chromophores frequently show high values of $\chi^2$ and $\chi^3$. Preferably, in accordance with this embodiment of the present invention the compound having the general formula (I) given previously has a length of n=5. It will be appreciated that with very large values of n, materials may become difficult to manipulate due to reduced solubility. However, it will also be appreciated that using large alkyl chains on the R groups will alleviate this problem.

In yet another embodiment of the present invention, wherein n>0, all double bonds are in the E-configuration and $Ar^1$ and $Ar^3$ have identical electron withdrawing or electron donating substituents. It will be appreciated that materials with extended chromophores frequently show high values of $\chi^3$. In a preferred embodiment, the compound having the general formula (I) given previously has a length of n=5. It will be appreciated that with very large values of n, materials may become difficult to manipulate due to reduced solubility. However, it will also be appreciated that using large alkyl chains on the R groups will alleviate this problem.

Another embodiment of the present invention is an extended version wherein n>0, but some C=C double bonds have the E-configuration and some C=C double bonds are locked into the Z-configuration. $Ar^1$ and $Ar^3$ have identical or different electron withdrawing or electron donating substituents. In a preferred embodiment of the invention, the compound having the general formula (I) given previously has a length of n=4 and the central C=C double bond is in the E-configuration and the remaining C=C double bonds are in the Z-configuration. The materials in accordance with this aspect of the present invention with extended chromophores frequently show high values of $\chi^2$ and $\chi^3$. It will be appreciated that with very large values of n, materials may become difficult to manipulate due to reduced solubility. It will also be appreciated that using long alkyl chains on the R groups will alleviate this problem.

A nonlinear optical device in accordance with the present invention includes means to direct at least one incident beam of electromagnetic radiation into an optical element having nonlinear optical properties whereby electromagnetic radiation emerging from the element contains at least one frequency different from the frequency of any incident beam of radiation, the different frequency being an even multiple of the frequency of one incident beam of electromagnetic radiation. The optical element includes a compound which is captured in a noncentrosymmetric material, the compound having the general formula (I) given previously.

Preferably, the emerging radiation of a different frequency is doubled (second order) (SHG). Preferably, the electromagnetic radiation is from one of a number of common lasers, such as Nd-YAG, Raman-shifted Nd-YAG, and Ar or Kr ion and semiconductor diode.

The optical element is oriented in one of a potentially infinite number of crystal orientations which achieve partially maximized SHG conversion by virtue of phase matching. The specific orientation is chosen for reasons of noncriticality, maximum nonlinearity, increased angular acceptance, etc. For example, polarized light of wavelength 1.06μ from a Nd-YAG laser is incident on the optical element along the optical path. A lens focuses the light into the optical element, light emerging from the optical element is collimated by a similar lens and passed through a filter adapted to remove light of wavelength 1.06μ while passing light of wavelength 0.532μ.

The optical element is preferably a single crystal or a poled material of a type well known in the art having at least one dimension of about 0.5 mm or greater but can be of one or more substantially smaller crystals embedded in a film of polymer or in glass. The smaller crystals can be randomly oriented or aligned with the same orientation, but are preferably aligned. For the smaller crystals, if their size is small enough to minimize light scattering, they can be dispersed in the polymeric binder and pressed, molded or shaped into an optically clear element capable of SHG. It will be appreciated that the polymer binder should be chosen to be a non-solvent for the aromatic compound. For larger crystallites, similar elements can be prepared and it is preferred that the binder used has an index of refraction matched to the complex, so as to minimize light scatter yet remain transparent.

Another device in accordance with the present invention is an electrooptical modulator. An electrooptical modulator is an optical modulator in which a Kerr cell, an electrooptical crystal or other signal controlled electrooptical device is used to modulate the amplitude, phase, frequency or direction of a light beam. The electrooptical modulator includes a means to direct a coherent light beam into an optical element, and means to apply an electric field to the element in a direction to modify the transmission property of the light beam, the optical element meeting the description given above for the optical element. The preferred optical elements for the nonlinear optical device and electrooptical modulator of the invention are those embodiments set forth earlier herein for the nonlinear optical element. More particularly, an electrooptical modulator embodying the present invention utilizes an optical element. A pair of electrodes are attached to the upper and lower surfaces of the element, across which a modulating electric field is applied from a conventional voltage source. The optical element is placed between two polarizers. A light beam, such as that from a Nd-YAG laser, is polarized by a polarizer focused on the optical element propagated through the crystal or crystals and subjected to modulation by the electric field. The modulated light beam is led out through an analyzer polarizer. Linear polarized light traversing the optical element is rendered elliptically polarized by action of the applied modulating voltage. A polarizer renders the polarization linear again. Application of the modulating voltage alters the birefringence of the optical element and consequently is ellipticity impressed on the beam. The polarizer then passes a greater or lesser fraction of the light beam as more or less of the elliptically polarized light projects onto its nonblocking polarization direction.

Another device, in accordance with the invention, is a device to reduce the size of a coherent light beam. The device increases the density of information on an optical read-write storage device. An optical element as described above for the optical element of the nonlinear optical device is affixed to the surface of an optical information storage medium of a type well known in the art. As the coherent optical beam travels through the element to the medium, the beam size is reduced because the center of the beam, being of higher light intensity, experiences a different refractive index than the periphery of the beam. It will be appreciated that this effect originates from large $\chi^3$ in the optical element. Accordingly, the smaller beam size allows more information to be stored in a fixed surface.

Another device, in accordance with the present invention, is an all optical switch. In an optical switch, two light guides composing the optical element lie in close proximity. A light pulse moving through this region passes from one guide to the other and back. As the pulse tracks down the switch the number and frequency of passes is determined by the switch geometry and the refractive index of the medium. Ultimately, the pulse exits through one of the two guides at the end of the switch creating an "on" or "off" state. Since the refractive index of the optical element is a function of light intensity, a $\chi^3$ effect, the switch is controlled "on" or "off" by the intensity of the pulse entering the switch. Such switching devices can be the basis for all optical computers. See, for example, Service, R. F. "Nonlinear Competition Heats Up", *Science*, 1995, 267, 1918–21, incorporated herein by reference.

Yet another device in accordance with the present invention is a three dimensional information storage device. The device requires a photorefractive material of a type well known in the art. It is well known that photorefractive organic materials can be prepared and caused to function in this manner. See Dagan, "Chemical Engineering News", Feb. 20, 1995, p. 28–32 and Mar. 6, p. 22–27 and Vu, L.; Chan, W. K.; Pong, Z.; Gharari, A., "Multifunctional Polymers Exhibiting Photorefractive Effects" Accts. *Chem. Res.* 1996, 29, 13–21, each document incorporated herein by reference. In this instance, compound (I) described above constitutes the primary component in the photorefractive material, i.e., the nonlinear optical material.

Compounds of the type having nonlinear optical properties represented by the general formula (I) as provided above may be synthesized by direct electrophilic aromatic substitution of diphenylethylene units and/or McMurry type coupling reactions as well known in the art. Provided below are examples representative of the preparation of compounds in accordance with the present invention.

EXAMPLE 1

A solution of 0.518 g 2,2,5,5-tetramethyl-3,4-diphenylhex-3-ene and 0.608 g Hg(NO$_3$)$_2$H$_2$O was refluxed in trifluoroacetic acid (TFA) for 30 min. The TFA was removed under reduced pressure and the residue was dissolved in CH$_2$Cl$_2$. The solution was washed with aqueous sodium bicarbonate and the solvent evaporated to give the crude product, 0.691 g. This was purified by chromatography on silica gel (25% CH$_2$Cl$_2$-hexane) to give 0.50 g pure 2,2,5,5-tetramethyl-3,4-di(4-nitrophenyl)hex-3-ene. This showed $^1$H NMR (CDCl$_3$): δ0.69 (s, 18H), 7.34–7.39 (d, 4H), 8.16–8.21 (d, 4H).

EXAMPLE 2

A solution of 0.62 g 2,2,5,5-tetramethyl-3,4-di(4-nitrophenyl)hex-3-ene,2.6 g cyclohexene and 1.4 g 10% Pd/C in THF was refluxed for 2 hrs. The Pd/C was removed by filtration and the residue after evaporation of the solvent was purified by chromatography on silica gel (25% CH$_2$Cl$_2$-hexane) to give 0.285 g (50%) 2,2,5,5-tetramethyl-3-(4-nitrophenyl)-4-(4-aminophenyl)hex-3-ene: $^1$H NMR (CDCl$_3$): δ0.66 (s, 8H), 0.70 (s, 8H), 3.61 (s, 2H), 6.61–6.63 (d, 2H), 7.30–7.34 (d, 2H), 8.12–8.14 (d, 2H): $^{13}$C NMR (CDCl$_3$): δ32.81, 32.84, 37.59, 38.16, 113.58, 121.93, 131.34, 131.48, 133.12, 143.78, 144.58, 146.22, 146.88, 152.11.

For a more detailed discussion of the preparation of compounds of the type having nonlinear optical properties represented by the general formula (I) as provided above reference is made to Gano, J. E., "Effects of Phenyl Substitution on the Fragmentation of Sterically Congested Di-tert-butylstilbene Radical Cations", *Journal of Mass Spectrometry*, 1996, 31, 363–366, incorporated herein by reference.

Having described presently preferred embodiments of the invention, it is to be understood that it may be otherwise embodied within the scope of the appended claims.

What is claimed is:

1. A compound having nonlinear optical properties of the general formula (I):

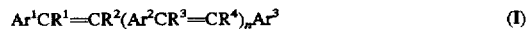

wherein, n represents a whole number;

R¹, R², R³ and R⁴ groups are independently selected from H, branched aliphatic, straight chain aliphatic, branched silane or straight chain silane;

Ar¹ and Ar³ are aromatic radicals each having a substituent independently selected from H, branched aliphatic, straight chain aliphatic, branched silane or straight chain silane in at least one position adjacent to a site of attachment of said C=C double bond and having at least one electron withdrawing or electron donating substituent in at least one of the remaining positions; and Ar² is an aromatic radical having a substituent independently selected from H, branched aliphatic, straight chain aliphatic, branched silane or straight chain silane in at least one position adjacent to a site of attachment of said C=C double bond;

with the proviso that said substituents in at least one position adjacent to said sites of attachment of said C=C double bonds and R¹, R², R³ and R⁴ groups are sufficiently large to cause Ar¹, Ar² and Ar³ to rotate approximately perpendicular to a plane containing each of said adjacent C=C double bonds and its substituents.

2. The compound of claim 1 wherein Ar¹ Ar² and Ar³ are independently selected from aromatic radicals and heterocyclic aromatic radicals.

3. The compound of claim 2 wherein the aromatic radicals are independently selected from radicals of benzene, naphthalene, anthracene and biphenyl.

4. The compound of claim 2 wherein the heterocyclic aromatic radicals contain nitrogen, oxygen, phosphorous, sulfur or selenium.

5. The compound of claim 4 wherein the heterocyclic aromatic radicals are independently selected from radicals of heterocyclic ethers and heterocyclic amines.

6. The compound of claim 1 wherein the substituents of the aromatic radicals may be independently selected from H, alkyl, branched alkyl, silyl, alkylsilyl, dialkylsilyl, and trialkylsilyl.

7. The compound of claim 1 wherein the substituents of the aromatic radicals may be independently selected from H and tertiary butyl.

8. The compound of claim 1 wherein the electron donating substituent is an organic substituent which contributes electron density to the π electron system when the compound is polarized by electromagnetic energy.

9. The compound of claim 1 wherein the electron donating substituent is independently selected from —O⁻, —COO⁻, —OR, —CR₃, —OCOR, —NR₂, or —SR where R group is any alkyl group or H.

10. The compound of claim 1 wherein the electron withdrawing substituent is an electronegative organic substituent which attracts electron density from a π electron system when the compound is polarized by electromagnetic energy.

11. The compound of claim 1 wherein the electron withdrawing substituent is independently selected from —NR₃⁺, —SR₂⁺, —NO₂, —SO₂R, —SO₃R, —CN, —SO₂Ar, —COOH, —F, —Cl, —Br, —I, —COOR, —COR, —CCR, —Ar, —CH=CR₂, or —C(CN)=C(CN)₂ where R group is any alkyl group or H.

12. The compound of claim 1 wherein the electron withdrawing properties of the compound may be varied by attaching an acidic or a basic substituent on at least one of the aromatic radicals Ar¹, Ar² and Ar³.

13. The compound of claim 1 wherein the electron donating substituent or the electron withdrawing substituent may be at a meta or a para position of at least one of the aromatic rings Ar¹, Ar² and Ar³.

14. The compound of claim 1 wherein R¹, R², R³ and R⁴ groups may be independently selected from H, alkyl, branched alkyl, silyl, alkylsilyl, dialkylsilyl, and trialkylsilyl.

15. The compound of claim 1 wherein R¹, R², R³ and R⁴ groups may be independently selected from H and tertiary butyl.

16. The compound of claim 1 wherein the alkyl or silyl substituents of the aromatic radicals Ar¹, Ar² and Ar³ or of R¹, R², R³ and R⁴ groups contain from 1–5 carbon atoms to effectively control the rotation of the aromatic rings.

17. The compound of claim 1 wherein the alkyl or silyl substituents of the aromatic radicals Ar¹, Ar² and Ar³ or of R¹, R², R³ and R⁴ groups contain more than 5 carbon atoms to effectively control the rotation of the aromatic rings.

18. The compound of claim 1 wherein the compound is in a Z-configuration with adjacent chromophore substituents twisted out of conjugation.

19. The compound of claim 18 wherein a link is established between at least two of the R groups to prevent isomerization of the compound.

20. The compound of claim 18 wherein the compound is substituted Z-stilbene with adjacent chromophore substituents twisted out of conjugation.

21. The compound of claim 20 wherein the substituted Z-stilbene includes cofacial, locked arene rings.

22. The compound of claim 20 wherein R¹ group and R² group are each a tertiary butyl group.

23. The compound of claim 20 wherein Ar¹ includes a para nitro group and Ar³ includes a para amino group.

24. The compound of claim 20 wherein Ar¹ and Ar³ include hydroxyl groups in the para position of both rings or amino groups in the para position of both rings.

25. The compound of claim 20 further comprising a plurality of compounds of the general formula (I) packed together into interlocking doublets.

26. The compound of claim 1 wherein all C=C double bonds are in a Z-configuration and Ar¹ includes an electron withdrawing substituent and Ar³ includes an electron donating substituent.

27. The compound of claim 1 wherein all C=C double bonds are in a Z-configuration and Ar¹ and Ar³ each include identical electron withdrawing substituents.

28. The compound of claim 1 wherein all C=C double bonds are in a Z-configuration and Ar¹ and Ar³ each include identical electron donating substituents.

29. The compound of claim 1 wherein the compound is substituted E-stilbene with adjacent chromophore substituents twisted out of conjugation.

30. The compound of claim 29 wherein the R¹ group and R² group are each tertiary butyl.

31. The compound of claim 29 wherein Ar¹ includes an electron withdrawing group and Ar³ includes an electron donating group.

32. The compound of claim 29 wherein Ar¹ includes a para nitro group and Ar³ includes a para amino group.

33. The compound of claim 1 wherein all C=C double bonds have an E-configuration and Ar¹ and Ar³ include an electron withdrawing and an electron donating substituent, respectively.

34. The compound of claim 1 wherein all C=C double bonds are in a E-configuration and Ar¹ and Ar³ have identical electron withdrawing or electron donating substituents.

35. The compound of claim 1 including at least one C=C double bond in the E-configuration and at least one C=C double bond in the Z-configuration.

36. The compound of claim 35 wherein one C=C double bond is in the E-configuration and the remaining C=C double bonds are in the Z-configuration.

37. A compound having nonlinear optical properties of the general formula (I):

$$Ar^1CR^1=CR^2(Ar^2CR^3=CR^4)_nAr^3 \quad (I)$$

wherein, n represents a whole number;

$R^1$ and $R^2$ groups are tertiary butyl;

$Ar^1$ and $Ar^3$ are aromatic radicals each having a substituent independently selected from H in a position adjacent to a site of attachment of said central C=C double bond and having at least one electron withdrawing or electron donating substituent in at least one of the remaining positions;

with the proviso that $R^1$ and $R^2$ groups are sufficiently large to cause $Ar^1$ and $Ar^3$ to rotate approximately perpendicular to a plane containing said adjacent central C=C double bond and its substituents.

38. A nonlinear optical device comprising a nonlinear optical element, a source of coherent radiation and a means for directing said radiation into said element, said nonlinear optical element comprising a compound of the general formula:

$$Ar^1CR^1=CR^2(Ar^2CR^3=CR^4)_nAr^3 \quad (I)$$

wherein, n represents a whole number;

$R^1$, $R^2$, $R^3$ and $R^4$ groups are independently selected from H, branched aliphatic, straight chain aliphatic, branched silane or straight chain silane;

$Ar^1$ and $Ar^3$ are aromatic radicals having a substituent independently selected from H, branched aliphatic, straight chain aliphatic, branched silane or straight chain silane in at least one position adjacent to a site of attachment of said C=C double bond and having at least one electron withdrawing or electron donating substituent in at least one of the remaining positions;

$Ar^2$ is an aromatic radical having a substituent independently selected from H, branched aliphatic, straight chain aliphatic, branched silane or straight chain silane in at least one position adjacent to a site of attachment of said C=C double bond;

with the proviso that said substituent in at least one position adjacent to said site(s) attachment of said C=C double bond(s) and $R^1$, $R^2$, $R^3$ and $R^4$ groups are sufficiently large to cause $Ar^1$, $Ar^2$ and $Ar^3$ to rotate approximately perpendicular to a plane containing each said adjacent C=C double bond and its substituents.

39. The nonlinear optical device of claim 38 wherein the compound having the general formula (I) is captured in a noncentrosymmetric material.

40. The nonlinear optical device of claim 38 wherein the nonlinear optical element is a single crystal or a poled material.

41. The nonlinear optical device of claim 38 wherein the device is an electrooptical modulator.

42. The nonlinear optical device of claim 41 wherein the electrooptical modulator includes said means to direct a coherent light beam into the nonlinear optical element and an electric field for modifying the transmission property of the light beam, wherein the light beam traverses the optical element and is rendered elliptically polarized and then linear by action of the electric field thereby altering the birefringence of the optical element.

43. The nonlinear optical device of claim 38 wherein the optical element of the nonlinear optical device is affixed to a surface of an optical information storage medium such that as a coherent optical light beam travels through the optical element to the information storage medium a center of the coherent light beam experiences a different refractive index than a periphery of the coherent light beam to increase the density of information on an optical read-write storage device.

44. The nonlinear optical device of claim 38 wherein the optical element of the nonlinear optical device is affixed to a surface of an optical information storage medium such that as a coherent optical light beam travels through the optical element to the information storage medium the beam size is reduced.

45. The nonlinear optical device of claim 38 wherein the device is an all optical switch.

46. The nonlinear optical device of claim 38 wherein the optical element includes at least two light guides, wherein a light pulse moves between the light guides passing from one guide to the other and back such that as the light pulse tracks down a switch the number and frequency of passes is a function of the switch geometry and a refractive index of the optical element whereby the light pulse exits through one of the two guides at an end of the switch creating an "on" or "off" state.

47. The nonlinear optical device of claim 38 wherein the device is a three dimensional information storage device.

* * * * *